Jan. 2, 1962  A. L. BUNTING  3,015,132
METHOD OF MOLDING PLASTIC ARTICLES
Filed Sept. 22, 1958  2 Sheets-Sheet 1

INVENTOR.
ALBERT L. BUNTING
BY
SMITH, WILSON, LEWIS & McRAE

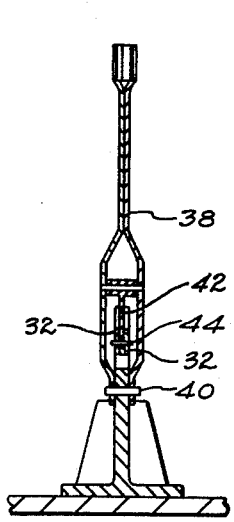
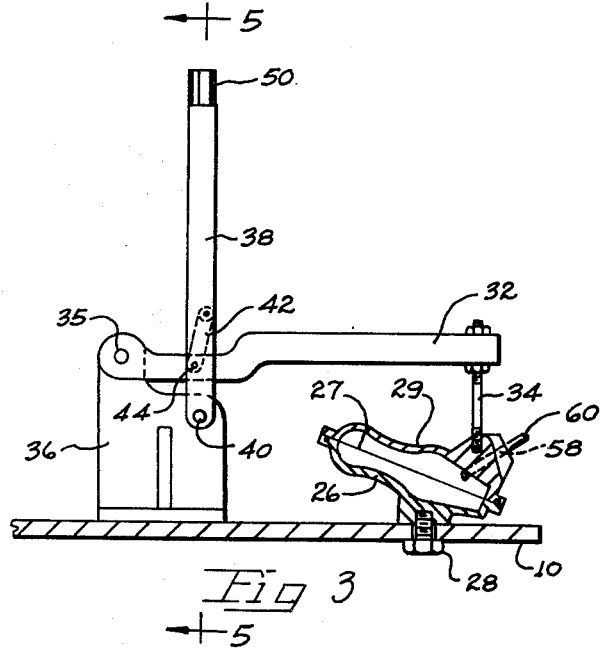
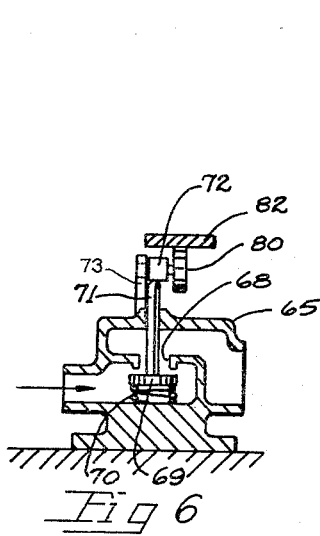
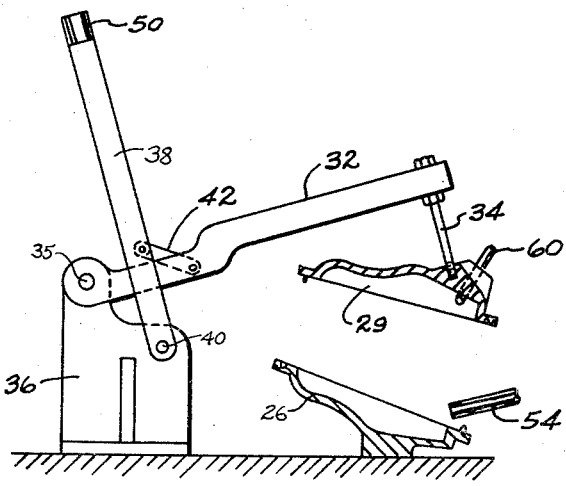

United States Patent Office 3,015,132
Patented Jan. 2, 1962

3,015,132
METHOD OF MOLDING PLASTIC ARTICLES
Albert L. Bunting, 24627 Rockford, Dearborn, Mich.
Filed Sept. 22, 1958, Ser. No. 762,496
8 Claims. (Cl. 18—48)

This invention relates to the production of articles formed by expanding granular material, such as polystyrene granules, under the influence of heat. Such "expanded granule" articles are formed by partially filling a mold cavity with granular material and injecting steam into the mold cavity so as to apply heat to the granules in such manner as to expand the granules and effect fusion of the individual granule particles. The result is a strong lightweight article which accurately conforms to the shape of the mold cavity. The procedure is susceptible to forming various different articles such as toy footballs, baseballs, Christmas tree ornaments, containers and other similar low cost articles.

Previous attempts to mass produce the "expanded granule" articles have not been entirely successful, due in part to the inability to control the rate and extent of fusion of the granules. In this connection, a too rapid or uneven application of heat will result in an imperfect granule expansion with an incomplete filling of the mold cavity by the final product.

In the present invention proper control of the heat application is partly effected by so injecting the steam into the mold cavity as to give the granules a turbulent motion. In this manner the granules are prevented from sticking together into a small mass or lump before the heat has been transmitted to all of the granules.

Proper heat application is also effected by the step of pre-coating the granules with a fusion-retarding film. In this manner the granules are allowed to fully expand before fusing together with each other.

One object of the present invention is to provide a method for forming articles of expanded granular material, wherein the formed article is free from undesired surface irregularities or imperfections.

Another object of the present invention is to provide a method for forming molded articles, wherein the apparatus is of such design as to provide a greatly increased volume of production as compared with previously known methods of operation.

Another object of the invention is to provide a method for forming molded articles, wherein the formed article is provided with a surface free from such films or mold release materials as would prevent or retard the proper adhesion of paint or other ornamental coating.

Another object of the invention is to provide a method for forming molded articles, wherein the molded article is subjected to a rapid cooling operation after its formation so as to promote high volume production.

Another object of the invention is to provide a method for forming articles of the expanded granule type, wherein steam is utilized to effect the expanding operation, the invention being particularly characterized by an arrangement for controlling the steam flow in such manner as to effect a precisely controlled steam injecting operation, both as regards the time period of steam injection, the steam pressure, and the steam temperature. In this connection it is a supplementary object to provide a steam supply system wherein surges of steam in the steam lines are prevented so as to provide an automatically regulated steam circulation system.

Another object of the invention is to provide a method for forming articles of the expanded granule type, wherein the heating and cooling periods are precisely controlled and regulated so as to promote the formation of uniform articles.

Other objects of this invention will appear in the following description and appended claims, reference being had to the accompanying drawings forming a part of this specification wherein like reference characters designate corresponding parts in the several views.

In the drawings:

FIG. 3 is an enlarged elevational view, with parts shown in section, of a mold cavity unit and opening-closing mechanism therefor utilized in the FIG. 1 apparatus.

FIG. 4 is a view similar to FIG. 3 but showing the component parts in the positions they occupy when the mold cavity members are in the open position.

FIG. 5 is a sectional view taken substantially on line 5—5 in FIG. 3.

FIG. 6 is a sectional view taken through a stream supply valve utilized in the FIG. 1 apparatus.

Figure 1:
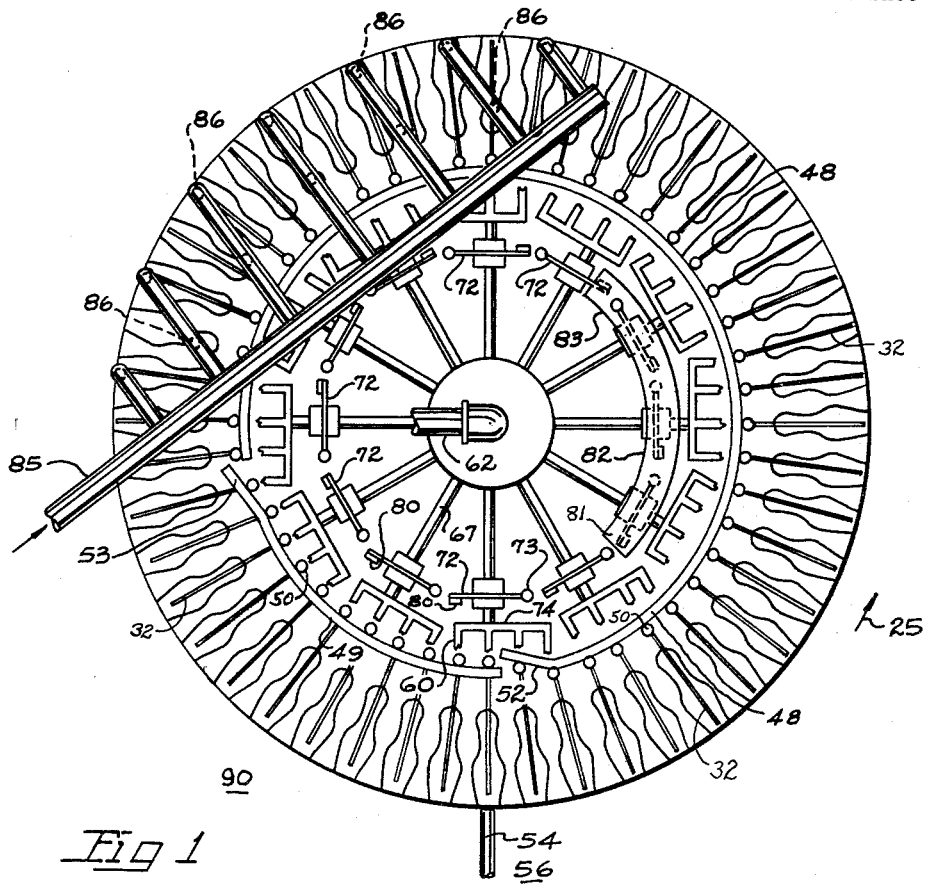
FIG. 1 is a plan view of one apparatus utilized in practice of the invention.
Figure 2:
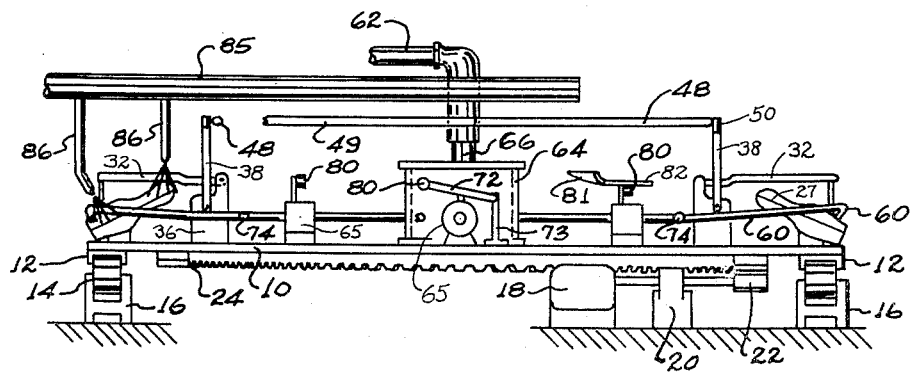
FIG. 2 is an elevational view of the FIG. 1 apparatus with certain of the mold cavity members removed for better illustrating the arrangement of parts.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a molding apparatus comprising an endless conveyor means in the form of a circular table 10 having an annular track 12 carried adjacent its outer periphery. Engaged with track 12 are rollers 14 mounted on fixed trunnions 16. In order to provide motive power for rotating the table 10 around its central axis there is provided an electric motor 18, speed reducer unit 20 and motor-driven pinion gear 22 in mesh with an endless ring gear 24 carried on the underside of the table. In use of the illustrated apparatus motor 18 is driven continuously so as to rotate table 10 at a constant speed in the arrow 25 direction.

Table 10 carries forty eight sets of mold cavity members arranged at equally spaced intervals about the table periphery. Each set of mold cavity members includes a lower mold cavity member 26 fastened directly onto table 10 by means of a screw 28, and a movable mold cavity member 29 mounted for opening and closing movements with respect to mold cavity member 26 by means of a lever 32. An adjustable length arm 34 serves to mount mold cavity member 29 on lever 32. The inner end of each lever is pivotally mounted at 35 on an upstanding bracket 36 fixedly carried on table 10. It will be noted from FIG. 3 that the parting line 27 between members 26 and 29 is located in line with pivot axis 35; as a result the mold cavity member 29 moves at right angles to the parting line during its initial upward movement so as not to bind on the molded article. In order to provide the motive force for moving lever 32 there is provided an upstanding cam follower arm 38 pivoted at 40 on bracket 36. Cam follower arm 38 pivotally carries a link 42 which extends downwardly to a pivotal connection 44 with lever 32. It will be noted from a comparison of FIGS. 3 and 4 that counterclockwise movement of cam follower 38 is effective to act through links 42 to raise lever 32 upwardly about its pivot 35 for opening mold cavity member 29. Reverse movement of arm 38 to the FIG. 3 position is effective to move mold cavity member 29 downwardly to its closed position as shown in FIG. 3.

In operation of the illustrated apparatus movement of cam follower 38 is effected automatically by means of two arcuately configured cam trackways 48 and 49. Trackway 48 is supported in fixed position above rotary table 10 (as shown in FIG. 1) by means of hanger brackets not shown. The operation is such that during rotation of table 10 in the arrow 25 direction cylindrical end portion 50 of cam follower arm 38 contacts the end portion 52 of cam trackway 48 so as to move cam follower 38 from the FIG. 4 position to the FIG. 3 position for closing the mold cavity member 29. Mold cavity member 29 remains closed until the table 10 has been rotated sufficiently to position the mold cavity member adjacent end portion 53 of trackway 49. Trackway 49 is, like trackway 48, fixedly mounted above the rotary table by bracket means not shown. Thus, as table 10 rotates in the arrow 25 direction so as to position a given one of the mold cavity members adjacent cam trackway end portion 53 the upper cylindrical end portion 50 of the cam follower arm 38 will be engaged with end portion 53 so as to move the cam follower arm 38 from the FIG. 3 position to the FIG. 4 open position. During the subsequent travel of conveyor table 10 the mold cavity member will remain in the open FIG. 4 position until its respective cam follower 38 engages end portion 52 of cam trackway 48. In the illustrated arrangement each set of mold cavity members is maintained in the closed position for approximately three-fourths of its travel and in its open position for about one-fourth of its travel. FIG. 1 shows trackway 48 as extending for a substantial distance around the periphery of the apparatus, but it will be understood that the trackway could be constructed to extend only for a sufficient arcuate extent to effect the mold-closing operation. In this connection it will be noted that link 42 is in an over-center position in the FIG. 3 position so as to prevent opening of mold cavity member 29 at an undersired point in the cycle.

In use of the illustrated apparatus the mold cavity members are fed with granular expandable polystyrene material from a hopper (not shown) through a feed tube 54 located at a feed station 56. Polystyrene materials suitable for the present process are commercially available under the tradename "Dylite" (Koppers Co.). Preferably, before the granular material is fed to the mold cavity members it is coated with a film of zinc stearate powder in a preferred ratio of approximately 200 grams zinc stearate per two hundred pounds of expandable polystyrene granules. Coating of the granules with zinc stearate may be conveniently effected by adding the zinc stearate into a rotary drum containing the granules. While zinc stearate has heretofore been used as a mold releasing material, the purpose of coating the polystyrene granules with zinc stearate in accordance with the present invention is to provide a fusion-retarding film on each granule which acts to delay complete fusion of the granular particles until they have expanded sufficiently to completely occupy the mold cavity. Use of zinc stearate for this purpose has been found to be particularly desirable because it does not prevent proper paint adhesion on the finished product.

It will be noted from FIG. 1 that immediately after each mold cavity has been filled with polystyrene granules portion 50 of cam follower 38 is caused to engage the end portion 52 of trackway 48 so as to move the mold cavity member 29 to the FIG. 3 closed position. End portion 52 of trackway 48 thereby serves as a mold member closing station.

As previously indicated, expansion and fusion of the granules is effected through the introduction of steam into the mold cavity. In the illustrated embodiment the steam is supplied from a line 62 which connects with a cylindrical steam chamber casing 64 through the mechanism of a conventional rotary coupling 66. The steam chamber formed by cylindrical element 64 is preferably of comparatively large volume so as to prevent surges in the line 62 pressure from having any appreciable effect on the pressure in the distributor lines 67 which radiate outwardly from the lower end portion of the steam chamber. Steam chamber 64 may be of different sizes in accordance with the number of mold cavities being supplied and the individual size of each mold cavity. However a suitable unit may employ a steam chamber volume of about sixty cubic inches for supplying forty eight mold cavities having individual mold cavity volumes of approximately four cubic inches. In any event the preferred capacity of the steam chamber should be in excess of the total cubic volume of the molds being steamed at any given instance.

In the illustrated apparatus, steam chamber 64 connects with twelve outwardly radiating steam lines 67, in each of which is located a flow-control valve 65 constructed as shown in FIG. 6. Each flow-control valve includes a flow-controlling orifice 68 adapted to be closed by a valve element 69 under the influence of a compression spring 70. Valve element 69 is provided with an upstanding plunger 71 which extends through the valve housing into abutment with an arm 72 pivotally carried on the upper end of a post 73 anchored on table 10. It will be seen that downward pivotal movement of arm 72 is effective on plunger 71 to open valve element 69 to permit steam to flow in the respective distributor line 67. Each distributor line 67 connects with a laterally extending pipe 74 which is provided with fittings for connection with four hoses 60. Each one of the mold cavity members 29 is provided with a steam inlet bore 58 which is adapted to receive an end of a hose 60 (for purposes of clarity the various hoses 60 are broken off in FIG. 1). It will thus be seen that the twelve distributor lines 67 are effective to supply the forty eight sets of mold cavity members with steam through the various hoses 60.

Normally spring 70 is effective to hold valve element 69 in the closed position. However as table 10 rotates in the arrow 25 direction roller 80 (rotatably carried on the free end of arm (72) is caused to strike end portion 81 of cam trackway 82 so as to move arm 72 downwardly for opening valve element 69. By referring to FIG. 1 it will be noted that cam trackway 82 extends for approximately one quarter of the arcuate travel of the individual mold members. Therefore it will be seen that steam will be injected into each set of mold cavity members during approximately one quarter of its travel through a complete cycle. While this is a preferred arrangement, it is to be understood that it may be varied as required to adapt the machine to any given operating condition.

After the roller 80 leaves the downstream end portion 83 of trackway 82 the flow of steam into the mold cavity will be discontinued. Thereafter cold water is sprayed onto the exterior surfaces of the mold cavity members 26 by the water distributing pipe 85. As will be seen from FIG. 1 pipe 85 is provided with twelve downwardly extending distributor pipes 86, each of which is provided with a nozzle at its lower end for distributing the cold water as a fine spray onto the outer surface of the mold cavity members. It will be noted that the mold cavity members 26 and 29 are thin wall structures without any jacketing or other external walls. By constructing the mold cavity members as thin walled structures the mold cavity and its contents can be cooled quickly by the cold water spray. Prior art methods have employed jackets in which the molds are heated with steam and then cooled with cooling water which has been circulated to cool the mold and its contents. However, these jackets have given the mold a comparatively large wall mass which tended to retard the heating and the cooling action so as to unduly extend the cycle time. Additionally, with such structures the hot steam tended to form a film on the jacket walls which acted as a retardant to effective heat transfer. The result was an unduly protracted cycle time having the effect of reducing total volume produced. The illustrated apparatus is particularly designed for high volume production, one commercial construction being capable of producing three thousand articles per hour.

After the mold cavity has passed beyond the cooling station formed by water supply pipe 85, it reaches the end portion 53 of track 49 so as to automatically be opened to the position shown in FIG. 4. The operator for the machine stands in the area generally indicated by numeral 90 (FIG. 1) to remove the articles from the mold cavity and inspect them for possible defects. The rate of conveyor table rotation is selected in accordance with the size of the finished article, but as an example, in one commercial installation designed to produce three inch spherical articles with apparatus having forty eight mold cavities, table 10 is given a rotational speed of approximately one r.p.m. Such rotational speed is sufficiently slow to enable an operator to easily remove and inspect the formed article from the mold cavity before the mold cavity is again fed with granular material from tube 54. If desired, an automatic ejection unit may be employed. The apparatus may be utilized to form articles of any desired shapes, as for example spheres, oblate spheroids, containers, decorative articles, bowling pins (as illustrated) and the like, or similar article.

From the above description it will be seen that the molding cycle consists in:

(1) Feeding the mold cavity with coated granules (station 56)
(2) Closing the mold cavity (cam section 52)
(3) Injecting steam into the mold cavity (depression of arm 72 by track 82)
(4) Spray cooling the molds (pipes 85, 86)
(5) Opening the mold cavity (cam section 53)

The entire cycle is controlled automatically without expensive timing mechanism or other controls which must be constantly attended by skilled technicians.

It will be noted from FIG. 3 that steam supply passage 58 is directed on a line offset from the longitudinal axis of the mold cavity. The steam is thus injected into the mold cavity so as to travel along the inside surface of the mold members and thereby travel underneath the granules. As a result the steam tends to lift or shoot the granules (which are comparatively light in weight) up into the mold cavity with turbulent movements. In this manner the heat is enabled to travel evenly into each granule so as to cause expansion of all granules before fusion and solidification into a solid mass. With certain prior art methods the steam was injected down onto the upper surface of the granules as a series of separate sprays. Such an injection procedure tended to pack down the granules and promote an improper, uneven distribution of the heat which prevented complete expansion of some granules; the result was a product which did not always fully conform to the shape of the mold cavity.

I claim:

1. In a method of molding bodies from expandable granules of polystyrene, the steps of coating expandable polystyrene beads with a film of zinc stearate in a ratio of at least about 1 gram of zinc stearate per one pound of polystyrene beads, introducing the coated granules into a mold cavity, injecting steam into the mold cavity to agitate the granules and to heat evenly all of the granules, thereby substantially uniformly expanding all of the granules before fusion into an integral mass, retaining the expanded granules in said mold in the pressure of the steam for a sufficient period of time to cause fusion into an integral mass, and quenching the fused mass.

2. The method of molding a body from thermally expandable granules of polystyrene, comprising the steps of coating the thermally expandable granules of polystyrene with fusion-retarding film, feeding said coated granules into a mold cavity, simultaneously agitating and heating the coated granules to expand them and to cause dilution of said fusion-retarding film to a point where it no longer serves to insulate the granules from one another, continuing to heat the expanded granules to fuse them into an integral mass, and cooling said fused mass to provide the molded body.

3. The method of claim 2 wherein the fusion-retarding film comprises zinc stearate.

4. In a method of molding a body from granules of a thermally expandable resin, the steps of coating the thermally expandable granules with a fusion-retarding film, introducing said coated granules into a mold, simultaneously agitating and heating the coated granules interiorly of the mold to (1) expand them and (2) disrupt the fusion-retarding film to an extent such that the film no longer serves to resist fusion of the granules, continuing to heat the expanded granules to cause granule-to-granule fusion into an integral mass, and cooling said fused mass to provide the molded body.

5. In a method of molding a body from thermally expandable granules of polystyrene, the steps of coating each of the granules to prevent premature adherence of the granules to one another, charging a mold cavity with said coated granules, and simultaneously agitating and heating the coated granules to expand them and to fuse the expanded granules to one another only after expansion of the granules and disruption of the coating.

6. The method of claim 5 wherein the granules are coated with at least 0.2% by weight zinc stearate.

7. In a method of molding a body from granules of a thermally expandable resin, the steps of coating the thermally expandable granules with a fusion-retarding film, introducing said coated granules into a mold, simultaneously agitating and heating the coated granules interiorly of the mold, expanding the coated granules, disrupting the fusion-retarding film to an extent such that the film no longer serves to resist fusion of the granules, fusing the expanded granules into an integral mass, and cooling said mass to provide the molded body.

8. In a method of molding a body from thermally expandable beads wherein the beads are heated in a mold by the injection of steam, the steps of coating the beads prior to introduction into the mold with a fusion-retarding film to prevent premature fusion of said beads to one another, and simultaneously agitating and heating the coated granules by the steam to (1) expand them and (2) disrupt the fusion-retarding film to an extent such that the film no longer serves to resist fusion of the granules to one another.

References Cited in the file of this patent

UNITED STATES PATENTS

| | | |
|---|---|---|
| 519,127 | Jones | May 1, 1894 |
| 1,969,323 | Person | Aug. 7, 1934 |
| 2,014,468 | Clayton | Sept. 17, 1935 |
| 2,629,131 | Martin et al. | Feb. 24, 1953 |
| 2,651,809 | Mechur et al. | Sept. 15, 1953 |
| 2,661,496 | Lubenow | Dec. 8, 1953 |
| 2,672,652 | Howe | Mar. 23, 1954 |
| 2,713,935 | Bishop | July 26, 1955 |
| 2,744,291 | Stastny et al. | May 8, 1956 |
| 2,779,062 | Stastny | Jan. 29, 1957 |

OTHER REFERENCES

Dylite Expandable Polystyrene, Koppers Co., 1954, page 19.